United States Patent
Izdepski et al.

(10) Patent No.: US 8,542,108 B1
(45) Date of Patent: Sep. 24, 2013

(54) DYNAMIC DASHBOARD DISPLAY

(75) Inventors: Erich J. Izdepski, Falls Church, VA (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1008 days.

(21) Appl. No.: 12/359,272

(22) Filed: Jan. 23, 2009

(51) Int. Cl.
*B60Q 1/00* (2006.01)
*G01M 17/00* (2006.01)

(52) U.S. Cl.
USPC .......... 340/461; 340/438; 340/459; 701/33.2; 701/29.1; 701/31.7

(58) Field of Classification Search
USPC ........ 701/1, 301, 117, 50; 340/438; 345/520
See application file for complete search history.

(56) References Cited

U.S. PATENT DOCUMENTS

| | | | | |
|---|---|---|---|---|
| 5,764,139 A * | 6/1998 | Nojima et al. | ................. | 340/461 |
| 5,917,408 A * | 6/1999 | Cardillo et al. | ............... | 340/439 |
| 6,556,208 B1 * | 4/2003 | Congdon et al. | .............. | 345/520 |
| 6,587,759 B2 * | 7/2003 | Obradovich et al. | ............ | 701/1 |
| 6,700,504 B1 * | 3/2004 | Aslandogan et al. | ......... | 340/901 |
| 6,857,010 B1 * | 2/2005 | Cuijpers et al. | ............... | 709/219 |
| 7,676,324 B2 * | 3/2010 | Bae | ................................ | 701/117 |
| 7,683,771 B1 * | 3/2010 | Loeb | ............................. | 340/461 |
| 7,750,795 B2 * | 7/2010 | Nagata | .......................... | 340/438 |
| 2002/0198660 A1 * | 12/2002 | Lutter et al. | .................. | 701/301 |
| 2003/0142835 A1 * | 7/2003 | Enya et al. | ..................... | 381/86 |
| 2005/0203676 A1 * | 9/2005 | Sandell et al. | .................... | 701/3 |
| 2005/0273256 A1 * | 12/2005 | Takahashi | ..................... | 701/211 |
| 2007/0061724 A1 * | 3/2007 | Slothouber et al. | ........... | 715/716 |

* cited by examiner

*Primary Examiner* — Jennifer Mehmood
*Assistant Examiner* — Pameshanand Mahase

(57) ABSTRACT

A dashboard for use in a vehicle is provided. The dashboard comprises a dashboard display screen and a processor. The dashboard display presents a plurality of information components to a vehicle occupant and the processor determines a condition. The condition is comprised of at least one of a fuel condition, a brake fluid condition, a speed condition, a tire pressure condition, an oil condition, an engine condition, an instrument condition, a washer fluid condition, an anti-lock brake system condition, a traction control system condition, a windshield wiper motor condition, a safety restraint system condition, and a weather condition. The processor adapts a first display signal based on the condition and sends the first display signal to the dashboard display screen to command presentation by the dashboard display screen of the information components. Adapting the first display signal comprises at least one of changing size, changing location, and changing the scale of at least one information component presented on the dashboard display screen.

20 Claims, 7 Drawing Sheets

DYNAMIC DASHBOARD DISPLAY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A dashboard in an automobile may display a number of components to keep a driver informed of the speed and the engine RPMs of the vehicle as well as many of the operating conditions of the car (e.g., fuel level, oil level, engine temperature). Some of the components on the dashboard may also provide a warning to the driver that action is required (e.g., low fuel, low oil, overheated engine, low tire pressure). The number of components available to display on automobile dashboards has increased in the last few years as technology has advanced and more features have been integrated into automobiles (e.g., MP3 players, mobile phones, weather devices, global positioning system (GPS) devices).

The arrangement of the components on the dashboard may vary depending on the manufacturer of the automobile and may or may not indicate to an occupant of the automobile that action is required. In some vehicles, the components on the dashboard are physical objects (e.g., metal, plastic) and cannot be moved. In other vehicles, the components on the dashboard are dynamic LCD icons and can be re-arranged according to the preferences of the driver.

SUMMARY

In an embodiment, a dashboard for use in a vehicle is provided. The dashboard comprises a dashboard display screen and a processor. The dashboard display presents a plurality of information components to a vehicle occupant and the processor determines a condition. The condition is comprised of at least one of a fuel condition, a brake fluid condition, a speed condition, a tire pressure condition, an oil condition, an engine condition, an instrument condition, a washer fluid condition, an anti-lock brake system condition, a traction control system condition, a windshield wiper motor condition, a safety restraint system condition, and a weather condition. The processor adapts a first display signal based on the condition and sends the first display signal to the dashboard display screen to command presentation by the dashboard display screen of the information components. Adapting the first display signal comprises at least one of changing size, changing location, and changing the scale of at least one information component presented on the dashboard display screen.

In another embodiment, a method of presenting a dashboard display of a vehicle on a remote display is provided. The method comprises wirelessly transmitting a dashboard display access request message to the vehicle and then wirelessly receiving a dashboard display signal from the vehicle. The method also comprises the remote display presenting the dashboard display based on the dashboard display signal, wherein the dashboard display presented in the vehicle is substantially duplicated by the dashboard display presented on the remote display.

In another embodiment, a dashboard for use in a first vehicle is provided. The dashboard comprises a processor, a radio transceiver communicatively coupled to the processor, a plurality of software components, and a dashboard display screen. The plurality of software components, when executed by the processor, provide functionality of one of a sensor and a graphical display component. The dashboard display screen presents information based on a display command signal received from the processor. The processor transmits information from at least one of the software components with a sensor functionality to the radio transceiver for wirelessly transmitting to a second vehicle within proximity to the first vehicle. The processor transmits the display command signal to the dashboard display screen based on at least one of the software components with a graphical display component functionality. The display command signal changes at least one of the size, the location, and the color of the graphical display component based on at least one condition of the first vehicle.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
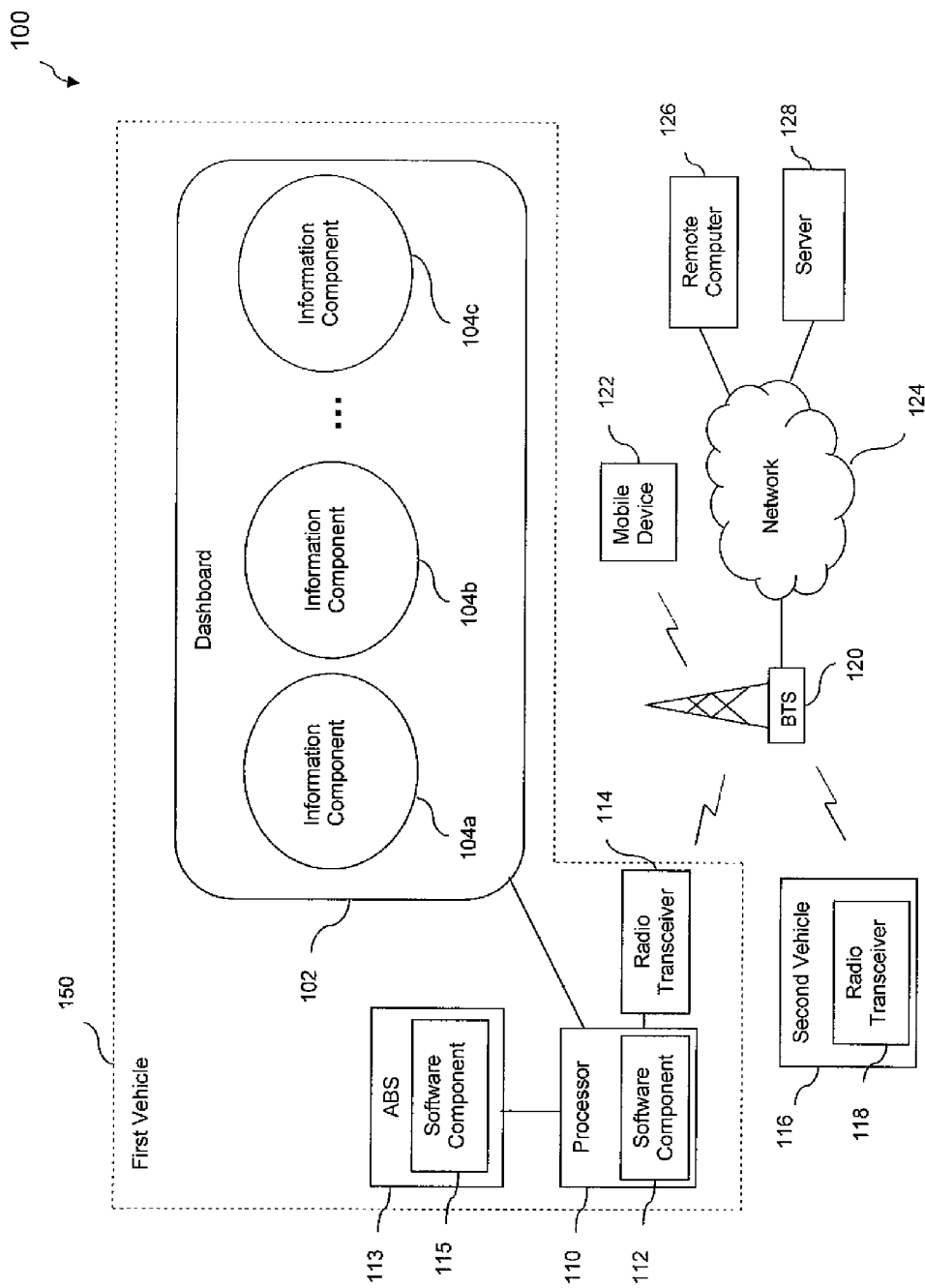
FIG. 1 illustrates a dashboard system for use in a vehicle according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A system and method for presenting a dynamic dashboard is disclosed. In an embodiment, elements displayed on an electronic dashboard display screen in a vehicle may be changed in size, location, scale, range, type of display element, brightness, and/or color in response to changes in the operating condition of a vehicle. A processor that controls the dynamic dashboard may determine a condition (e.g., speed condition, tire pressure condition, fuel condition, brake condition, windshield wiper condition) and then display information regarding the condition on the dynamic dashboard of the vehicle. For example, if the fuel level is low, the processor may move the fuel gauge display element on the dashboard to a more prominent and visible location, or change the fuel gauge display element in color or size, as an attempt to alert a driver of the vehicle of the low fuel condition. At the same time, the processor may move other gauge displays to a different location to make room for the display information, for example moving the other gauge displays rightwards or leftwards on the display. The processor may also reduce the size of the other gauge displays to make room for the display information.

In addition, the processor may display the fuel gauge with greater resolution of the fuel level, for example with a moving needle indicator that displays against a graduated rule scale including an increased number of divisions or markings than a standard graphical presentation of the fuel gauge. For example, under normal fuel level conditions, when the fuel level is greater than one-quarter tank full, the graduated rule scale may comprise indicators for full tank, three-quarters tank, half tank, one-quarter tank, and empty, corresponding to a relatively coarse level of resolution. When the fuel level is less than one-quarter tank full, however, the graduated rule scale may change to provide a relatively finer level of resolution and/or a greater number of divisions or markings, for example markings for every tenth tank, markings for every gallon of fuel, or otherwise. Additionally, the fuel gauge may be displayed over a partial range to increase resolution, for example showing only the range of one-quarter tank to empty, divided into ten divisions or markings. For example, if the tire pressure is low, the detailed alert or text may indicate which tire is low and by how many PSI. In another example, if the oil level is low, the detailed alert may include the quantity of oil remaining or the quantity of oil below the full level.

If multiple drivers use the same vehicle, each driver of the vehicle may customize the display of the components on the dashboard to an arrangement that suits individual driving preferences. In an embodiment, each driver may be able to command the dashboard to display the components in a pre-defined arrangement and to specify additional components to include (e.g., an MP3 player, a weather component, a mobile phone component). The pre-defined arrangement may also include a theme or color chosen by each driver. In an embodiment, the display of components may be customized by changing the type of display of the components, for example replacing a gauge-type display to a numeric value type display of substantially the same information. Alternatively, a gauge-type display of a component may be replaced by a tape-type display of the component.

In another embodiment, the component and condition information displayed on the dashboard may be accessed and viewed remotely. For example, if a change in a condition is presented to the driver of the vehicle, and the driver is unable to determine the significance of the change, the driver could contact an outside source (e.g., family member, car dealership) to help diagnose the problem. The outside source could then access a copy of the dashboard display, via a browser on a remote computer or a mobile device, and then inform the driver of the significance of the change and possibly any subsequent action to take. In another example, if the owner of a vehicle wants to know how much fuel is in the vehicle, without the necessity of being in or near the vehicle, the owner may obtain a display of information from the vehicle dashboard (e.g., fuel level) via a browser on the remote computer or mobile device.

In another embodiment, the processor that controls the display of information components on the dashboard may be coupled to a radio transceiver that can wirelessly transmit information to and from other vehicles within a proximity, as a means to share information between vehicles. The radio transceivers in the vehicles may communicate in a peer-to-peer fashion to share information, or they may communicate via a server that accumulates and analyzes the shared information from multiple vehicles that subscribe to the same service. In an embodiment, the processor in a first vehicle may receive travel condition information from a software component. If a second vehicle subscribes to the same service associated with the software component, the processor in the second vehicle may obtain the travel condition information, via radio transceivers, and present the information on the dashboard display of the second vehicle.

For example, if the anti-lock brake system, a traction control system, or an airbag system is activated in another vehicle or multiple vehicles in an area, a signal may be transmitted to the processor in the first vehicle. The processor may make an inference based on the information that a hazardous driving environment currently exits, and the processor may command the dashboard display to indicate hazardous road conditions or an accident in the vicinity. The indication may provide a graphical representation—for example an icon of a car crash, snow, rain, or other driving hazard—and the indication may also include a textual presentation of the condition, such as a recommendation to slow down or to take an alternate route. In another example, the activation of windshield wipers in one or more other vehicles in the vicinity may be inferred by the processor in the first vehicle to indicate rain in the area and the processor in the first vehicle may command the dashboard display in the vehicle to present and/or display a textual recommendation to activate the windshield wipers.

In an embodiment, when the processor in the vehicle commands the dashboard display screen to change a graphical display component in response to a change in condition, the change in the component may be in the form of re-positioning the component, enlarging the component, changing the scale of the component, changing the display type of the component, increasing the brightness of the component, changing the color of the component, or moving the component to a more prominent position. In some scenarios, other graphical display components that share the dashboard display screen may be moved and/or resized in coordination with the changed display of the graphical display component associated with the change in condition. The message sent to the driver could also include a recommendation to slow down, change routes, or to adapt to weather conditions. The software components that provide a graphical display in response to conditions, may be software widgets (e.g., a weather widget, a news widget, an airbag widget, an anti-lock brake widget, a traction control widget) that are each independently controlled by the processor in the vehicle. In an embodiment, the software components provide the graphical display indirectly, for example by providing a signal defining a presentation of a subject display element, and the processor commands the dashboard display to display the subject display element.

By communicating through a server that accumulates information from multiple vehicles, the shared information obtained from the various software components in a vehicle may also be used for future information. For example, if the driver is planning a trip and programs a destination into a GPS device, if the proposed driving route contains hazardous road or weather conditions, the system could notify the driver of the conditions and possibly recommend a different route. The shared information may be real-time or near real-time information related to driving and/or road conditions. The conditions may be inferred by the server by analyzing reports from vehicles in a specific area of anti-lock brake systems in the vehicles activating, traction control systems in the vehicles activating, windshield wiper systems in the vehicles activating, and other systems in the vehicles activating. In an embodiment, the information provided by the vehicles is not based on subjective driver reports but instead on the objective data related to systems in the vehicles. The server analysis and/or inference application may be able to discriminate spurious indications that do not relate to current driving conditions, for example a report from an isolated vehicle activating the windshield wiper system subsequent to activating the windshield washer function to clean a windshield, from reports that reflect current highway conditions, for example a plurality of reports from vehicles in the same area activating their windshield wiper systems implying rainy weather and wet highway surface conditions.

Turning now to FIG. 1, a system 100 of controlling a dynamic dashboard is described. The system 100 comprises a first vehicle 150, a dashboard 102, a plurality of information components 104a, 104b, 104c, a processor 110, a plurality of software components 112, a radio transceiver 114, a second vehicle 116 that contains a radio transceiver 118, a base transceiver station 120, a mobile device 122, a network 124, a remote computer 126, and a server 128. In an embodiment, the first vehicle 150 may further comprise an anti-lock brake system (ABS) 113 and an associated anti-lock brake software component 115. In an embodiment, the first vehicle 150 may further comprise a traction control system and an associated traction control software component (not shown). The dashboard 102 may be an electronic dashboard or liquid crystal display (LCD) panel that displays changes in vehicle operating conditions as well as changes in driving conditions. The plurality of information components 104a, 104b, 104c may comprise at least two of a speedometer display, a tachometer display, a temperature gauge display, an oil pressure gauge display, a voltage gauge display, a fuel gauge display, a transmission gear display, and a vehicle system status display. The processor 110 may control the dashboard 102, for example by sending a command or signal to the dashboard 102 causing the dashboard 102 to present the information, and may determine a condition to send to the information components 104a, 104b, 104c The plurality of software components 112 may also be referred to as software widgets that each provide a graphical display of information obtained from independent sources. As discussed above, the software components 112 may provide the graphical display of information to the dashboard 102 indirectly, for example, via the mediation of the processor 110 that may arbitrate the relative size, the scale, the position, the display type, the brightness, and the color of the graphical displays of information on the dashboard 102 and may send the command signal to the dashboard 102. The radio transceiver 114 may communicate directly to the radio transceiver 118 in the second vehicle 116, and/or both transceivers may communicate with each other through the base transceiver station 120, the network 124, and the server 128. The server 128 may accumulate information from multiple vehicles and share the information amongst vehicles that subscribe to the same service.

The mobile device 122 may be implemented as a mobile phone, personal digital assistant, media player, or any other mobile device having wireless communication capability. A mobile device 122 is discussed in detail hereinafter. The remote computer 126 may be implemented as a general purpose computer system. General purpose computers are discussed in detail hereinafter.

In an embodiment, the dashboard 102 is a dynamic changeable electronic dashboard that displays a plurality of information components 104a, 104b, 104c, that may change based on context (e.g., the driver of the vehicle, events within the vehicle, weather conditions, road conditions). The processor 110 may determine a condition (e.g., a fuel condition, a brake fluid condition, a speed condition, a tire pressure condition, an oil condition, an engine condition, an instrument condition, a washer fluid condition, an anti-lock brake system condition, a traction control system condition, a windshield wiper motor condition, a safety restraint system condition, a weather condition) and then change the location, size, scale, display type, brightness, and/or color of the associated information components 104a, 104b, 104c to notify or signal the driver of the vehicle if the change in condition may require attention. For example, if the processor 110 determines that the fuel tank is low, it may command the fuel gauge display component to increase in size and may also move it to the center of the display screen to alert the driver of the condition. In addition, the information may include a detailed textual explanation to alert the driver of the condition (e.g., the number of gallons of fuel left in the tank). At the same time, the processor 110 may reduce the size of and move other information components, for example information components 104a, 104b, leftwards or rightwards. In addition, the processor 110 may command the dashboard 102 to display the fuel gauge with greater resolution, for example, replacing a scale background that is coarsely gradiated with a different scale background that is more finely gradiated, for example, replacing a scale having five graduated markings with ten or twenty graduated markings. An increased display size or displaying a partial range within the same display size, for example a detail view of a fuel gauge showing the range from empty to quarter-tank, may enable an improved appreciation of a vehicle condition and/or operating condition.

If multiple drivers use the same vehicle, the plurality of information components 104a, 104b, 104c may be arranged and selected in a base or normal operating configuration based on the preferences of driver of the vehicle. In an embodiment, each driver may be able to define the normal operating mode arrangement of information components 104a, 104b, 104c, identify which component to include (e.g., an MP3 player, a weather display), and determine a color or theme to use. The configuration of each driver's preferences can be associated with an ignition key or a component on the dashboard so that each time the driver is in control of the vehicle, the pre-defined arrangement may be activated. It is understood that when triggering events within the car or external to the car occur, the processor 110 may re-arrange and re-size the information components 104a, 104b, 104c in a display arrangement that is different from the selected driver preference.

In another embodiment, the information on the dashboard 102 may be accessed from the remote computer 126 or the mobile device 122. For example, if one of the information components 104a, 104b, 104c displays a change in condition and the driver of the vehicle does not understand the meaning of the display change, the driver can use a mobile phone to call a second source (e.g., family, friend, car dealership) for advice. The second source may be able to access a copy of the display of information components 104*a*, 104*b*, 104*c* via a browser on the remote computer 126 or the mobile device 122 and diagnose the meaning of the change in condition. In another example, if the owner of the vehicle wants to find out if the fuel tank is low, without the necessity of being in or near the car, the owner may be able to view a copy of the display of information components 104*a*, 104*b*, 104*c* via the browser on the remote computer 126 or the mobile device 122.

In another embodiment, information can be shared among multiple vehicles that may subscribe to information provided by one or more of the same software components 112. In an embodiment, each of the plurality of independently operated software components 112 in the first vehicle 150, when executed by the processor 110, may provide information to display on each of the graphical information components 104*a*, 104*b*, 104*c*. The processor 110 in the first vehicle 150 may also be coupled to the radio transceiver 114, which may wirelessly communicate with the radio transceiver 118 in the second vehicle 116. The radio transceivers 114 and 118 may communicate peer-to-peer or they may communicate through the base transceiver station 120 and the network 124 with the server 128 that accumulates and analyzes information from multiple vehicles (not shown). For example, if an anti-lock brake system or traction control system in the second vehicle 116 is activated, and the first vehicle 150 is in close proximity, the processor 110 may transmit the information from the software component 112 associated with the anti-lock brake system or traction control system to the dashboard 102 in the first vehicle 150. In response, the processor 110 may command one of the information components 104*a*, 104*b*, 104*c* to change in size, location, color, and/or brightness to alert the driver of the first vehicle 150 of hazardous driving conditions. The information displayed may also include a resolution of the problem or recommend an action (e.g., slow down, take a different route).

The shared information obtained from the plurality of software components 112 in the first vehicle 150 may also be used for future information, for example, if the driver is planning a trip and programs a destination into a GPS device. If the proposed driving route contains hazardous road or weather conditions, the information components 104*a*, 104*b*, 104*c* on the dashboard 102 could notify the driver of the conditions. The notification may also recommend an alternate route or advise the driver to adapt to the hazardous weather conditions.

In an embodiment, vehicles in front of the first vehicle 150 may begin sliding on a slippery overpass, and the anti-lock brake systems in the forward located vehicles may activate. Software components 112 in one or more of the forward located vehicles may transmit information about the activation of their anti-lock brake systems to the serve 128. The server 128 may determine that the plurality of substantially concurrent activation of anti-lock brake systems in a specific area corresponds to an icy overpass. In an embodiment, analysis software in the server 128 may adapt and train over time to learn that a specific location, for example an overpass, is subject to icing over and presenting hazardous driving conditions. The server 128 may transmit an advance warning and/or a command to activate the anti-lock brake system 113 of the first vehicle 150. For example, the server 128 may wirelessly transmit a command message or an advisory message to the first vehicle 150. The processor 110 may forward the command message or advisory message to the software component 115 associated with the anti-lock brake system 113. The software component 115 may respond to the command message or advisory message by activating the anti-lock brake system 113 or by some other action, for example initiating presentation of a prominent display of the reports of anti-lock brake systems being activated by forward located vehicles. In an embodiment, the vehicle 150 may provide an override selection for a driver of the vehicle 150 to disable remote activation of the anti-lock brake system 113, for example remote activation by the server 128. While a scenario involving activation of the anti-lock brake system 113 was described above, similar scenarios are contemplated for remote activation of traction control systems, windshield wiper systems, and other systems of the vehicle 150.

Figure 2:
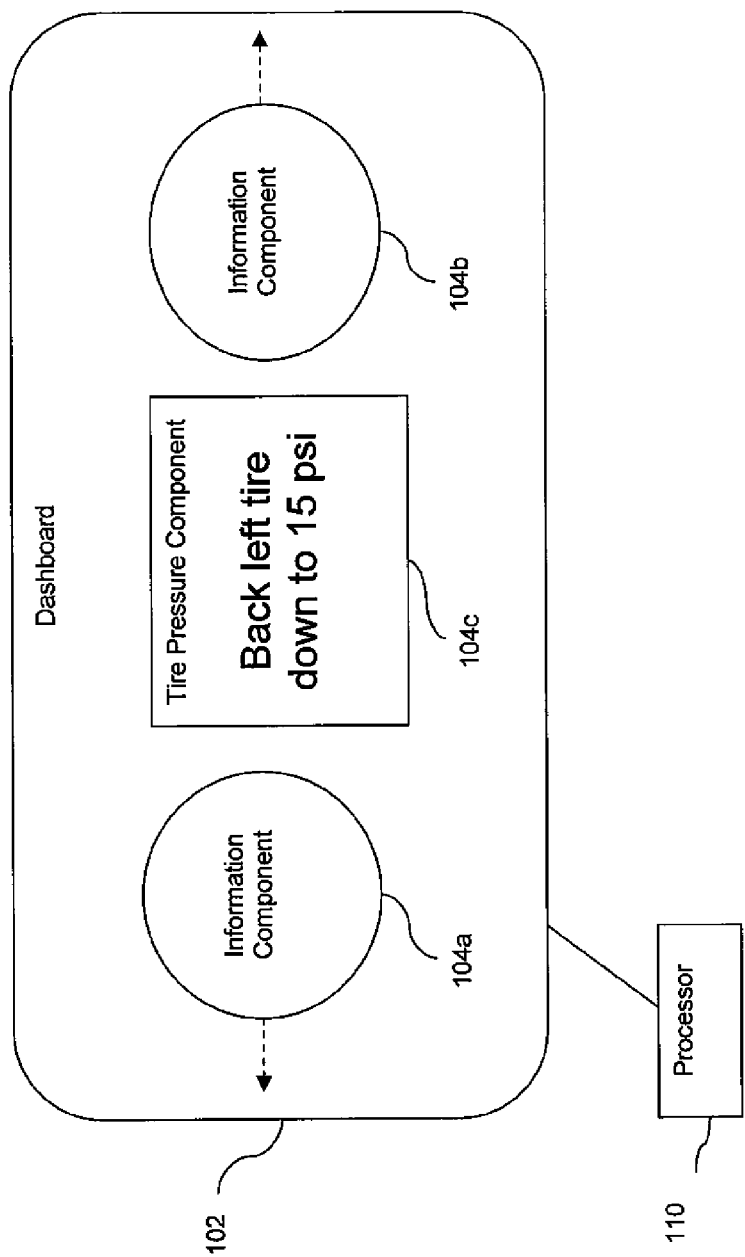
FIG. 2 illustrates a dashboard display according to an embodiment of the disclosure.

FIG. 2 illustrates an example of the information component 104*c* on the dashboard 102 adapting in response to a change in vehicle conditions. In an embodiment, the processor 110 may determine a condition (e.g., a fuel condition, a brake fluid condition, a speed condition, a tire pressure condition, an oil condition, an engine condition, an instrument condition, a washer fluid condition, an anti-lock brake system condition, a traction control system condition, a windshield wiper motor condition, a safety restraint system condition, a weather condition) and then change the location, scale, display type, size, brightness, and/or color of the associated information components 104*a*, 104*b*, 104*c* to notify or signal the driver of the vehicle of the change in condition. For example, if the processor 110 determines that the tire pressure is low, the tire pressure information component 104*c* may move to the center of the screen and increase in size to alert the driver of the condition. Concurrently, the information component 104*a* may be reduced in size and/or moved leftwards, and the information component 104*b* may be reduced in size and/or moved rightwards. In addition, the information may include a detailed explanation to alert the driver of the condition. For example, the tire pressure information component 104*c* may include a message that indicates the position of the tire that has low pressure and the PSI of air remaining in the tire. While illustrated as providing textual information in FIG. 2, in other scenarios the tire pressure information component 104*c* may provide information as a gauge-type of display or as a tape-type of display.

Figure 3:
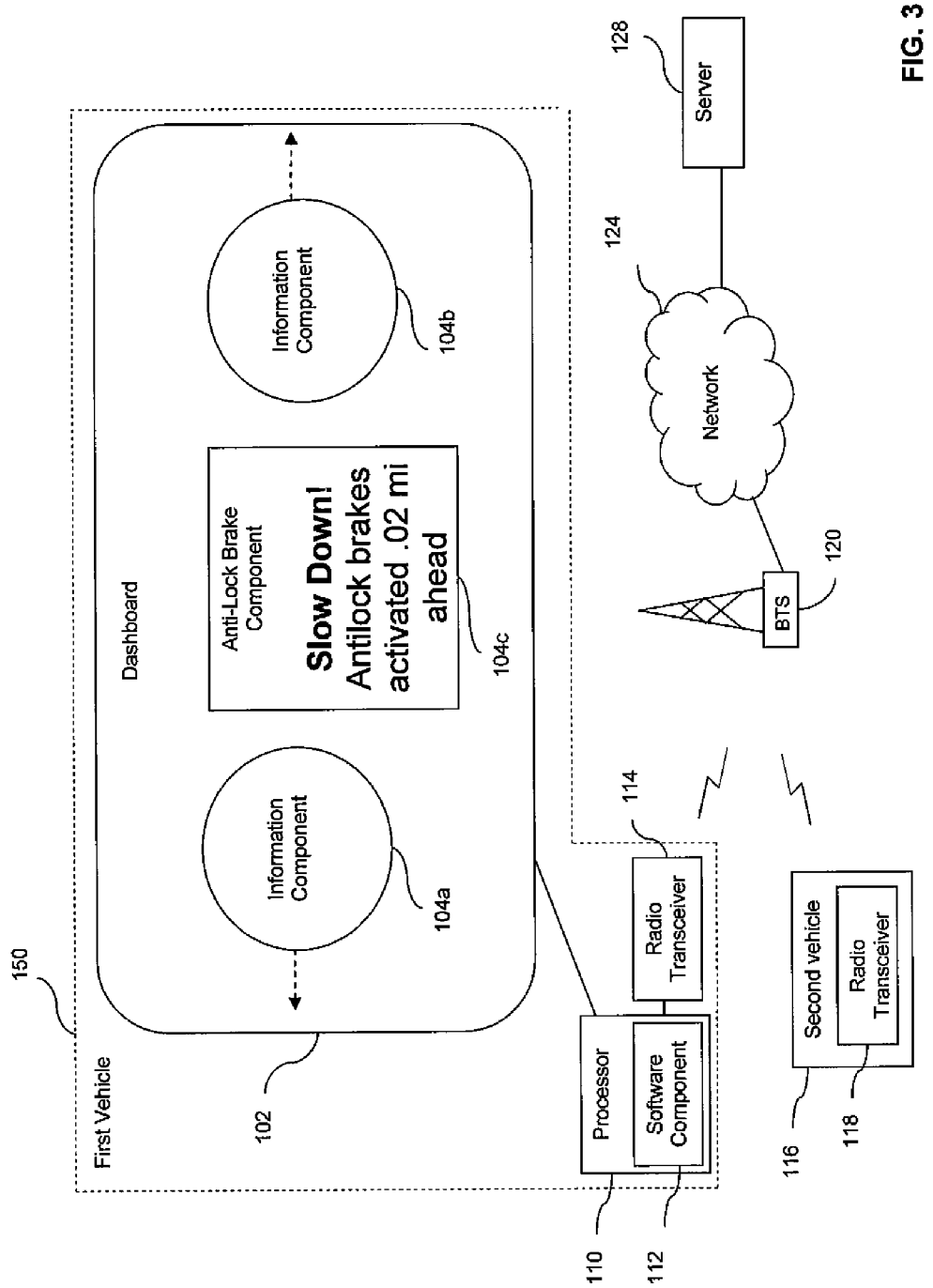
FIG. 3 illustrates a dashboard display according to an embodiment of the disclosure.

FIG. 3 illustrates an example of the information component 104*c* on the dashboard 102 in the first vehicle 150 adapting to a change-in-condition message from the second vehicle 116. In an embodiment, warning information can be shared among multiple vehicles that may subscribe to information provided by one or more of the same software components 112. Each software component 112, when executed by the processor 110, may re-act to a sensor and provide a graphical display for one of the information components 104*a*, 104*b*, 104*c*, for example via the mediation of the processor 110.

Each software component 112 may also be referred to as a software widget (e.g., a weather widget, a news widget, an airbag widget, an anti-lock brake widget, a traction control widget) that is controlled by the processor 110. The processor 110 in the first vehicle 150 may also be coupled to the radio transceiver 114, which may wirelessly communicate with the radio transceiver 118 in the second vehicle 116. The radio transceivers 114 and 118 may communicate peer-to-peer or they may communicate through the base transceiver station 120 and the network 124 with the server 128 that accumulates and analyzes information from similar software components in multiple vehicles (not shown) that subscribe to the same service. For example, if anti-lock brakes in the second vehicle 116 are activated and the first vehicle 150 is in a close proximity, the processor 110 may transmit the information from the software component 112 associated with the anti-lock brakes to the anti-lock brake information component 104*c* on the dashboard 102. The processor 110 may command the anti-lock brake information component 104*c* to change in size, location, color, and/or brightness to alert the driver of the first vehicle 150 of possible hazardous driving conditions. The information displayed may also present a higher resolution of the details of the condition and may recommend an action (e.g., slow down, take an alternate route).

By communicating through the server 128 that accumulates information from multiple vehicles, the shared information obtained from the plurality of software components 112 in the first vehicle 150 may also be used for future information. For example, if a driver is planning a trip and programs a destination into a GPS device, if the proposed driving route contains hazardous road or weather conditions, the information components 104a, 104b, 104c on the dashboard 102 could notify the driver of the conditions. The notification may also recommend a different route or advise the driver to adapt to any hazardous weather conditions.

Figure 4:
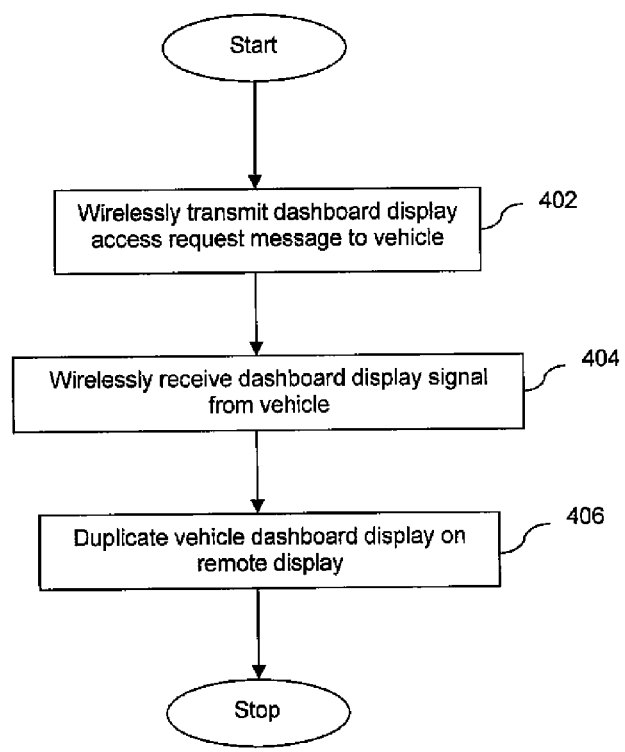
FIG. 4 is a flowchart of a method of presenting a dashboard display on a remote display, according to an embodiment of the disclosure.

Turning now to FIG. 4, a method 400 for presenting a copy of a vehicle's dashboard display on a remote display is described. The method 400 begins at block 402 where a user of the mobile device 122 or the remote computer 126 requests access, possibly via a web browser, to the information on the dashboard 102 in the first vehicle 150. In an embodiment, at least a portion of the communication path travelled by the request is provided wirelessly. The request may be in response to a call from the driver of the first vehicle 150 that may need help in diagnosing the change in one of the information components 104a, 104b, 104c on the dashboard 102. The change may be in response to a change in condition of at least one of a fuel condition, a brake fluid condition, a speed condition, an engine revolutions per minute condition, a tire pressure condition, an oil pressure condition, an oil level condition, an engine condition, an instrument condition, a washer fluid condition, an anti-lock brake system condition, a traction control system condition, a windshield wiper motor condition, a safety restraint system condition, and a weather condition. The change to one of the information components 104a, 104b, 104c may be a change in size, position, color, and/or brightness.

Proceeding to block 404, the mobile device 122 or the remote computer 126 may wirelessly receive an access signal from the dashboard 102 in the first vehicle 150. In block 120, the display screen on the mobile device 122 or the remote computer 126 may present a duplicate of the information components 104a, 104b, 104c on the dashboard 102. In an embodiment, by viewing the information components 104a, 104b, 104c, the user of the mobile device 122 or the remote computer 126 may be able to provide assistance to the driver of the first vehicle 150 by diagnosing a possible problem indicated by the change in one of the information components 104a, 104b, 104c.

Figure 5:
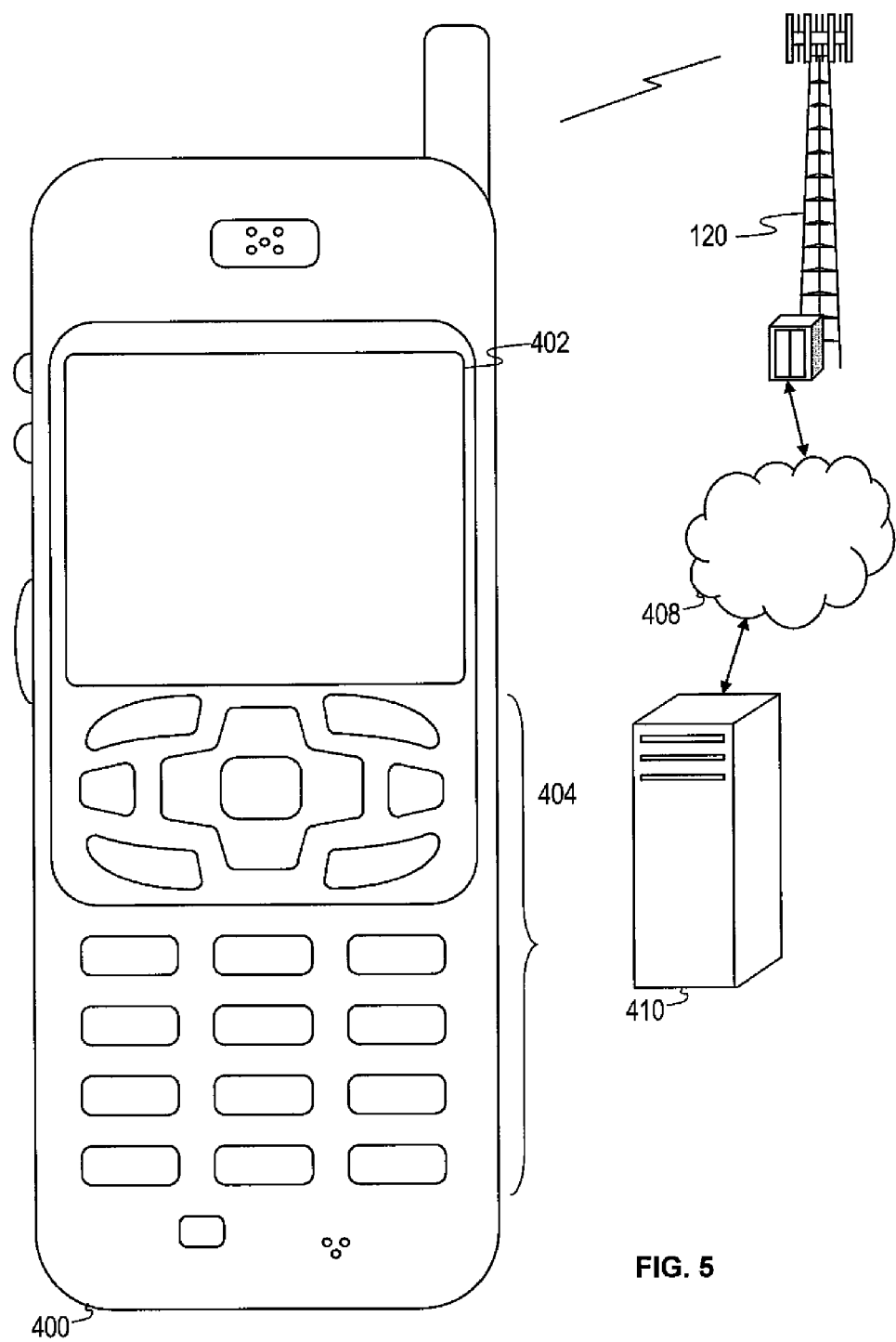
FIG. 5 illustrates a handset suitable for implementing an embodiment of the disclosure.

FIG. 5 shows a wireless communications system including the handset 400 which may be similar to the mobile device 122 in FIG. 1. FIG. 5 depicts the handset 400, which is operable for implementing aspects of the present disclosure, but the present disclosure should not be limited to these implementations. Though illustrated as a mobile phone, the handset 400 may take various forms including a wireless handset, a pager, a personal digital assistant (PDA), a gaming device, an inventory control device, a media player, a digital camera, a digital calculator, a portable computer, a tablet computer, or a laptop computer. Many suitable handsets combine some or all of these functions. In some embodiments of the present disclosure, the handset 400 is not a general purpose computing device like a portable, laptop or tablet computer, but rather is a special-purpose communications device such as a mobile phone, wireless handset, pager, or PDA. The handset 400 may support specialized activities such as gaming, inventory control, job control, and/or task management functions, and so on.

The handset 400 includes a display 402 and a touch-sensitive surface or keys 404 for input by a user. The handset 400 may present options for the user to select, controls for the user to actuate, and/or cursors or other indicators for the user to direct. The handset 400 may further accept data entry from the user, including numbers to dial or various parameter values to configure the operation of the handset. The handset 400 may further execute one or more software or firmware applications in response to user commands. These applications may configure the handset 400 to perform various customized functions in response to user interaction. Additionally, the handset 400 may be programmed and/or configured over-the-air, for example, from a wireless base station, a wireless access point, or a peer mobile device.

The handset 400 may execute a web browser application which enables the display 402 to show a web page. The web page may be obtained via wireless communications with a base transceiver station (BTS) 120, a wireless network access node, a peer handset 400, or any other wireless communication network or system. While a single base transceiver station 120 is illustrated, it is understood that the wireless communication system may comprise additional base transceiver stations. In some instances, the handset 400 may be in communication with multiple base transceiver stations 120 at the same time. The base transceiver station 120 (or wireless network access node) is coupled to a wired network 408, such as the Internet. Via the wireless link and the wired network, the handset 400 has access to information on various servers, such as another server 410. The other server 410 may provide content that may be shown on the display 402. Alternately, the handset 400 may access the base transceiver station 120 through a peer handset 400 acting as an intermediary, in a relay type or hop type of connection.

Figure 6:
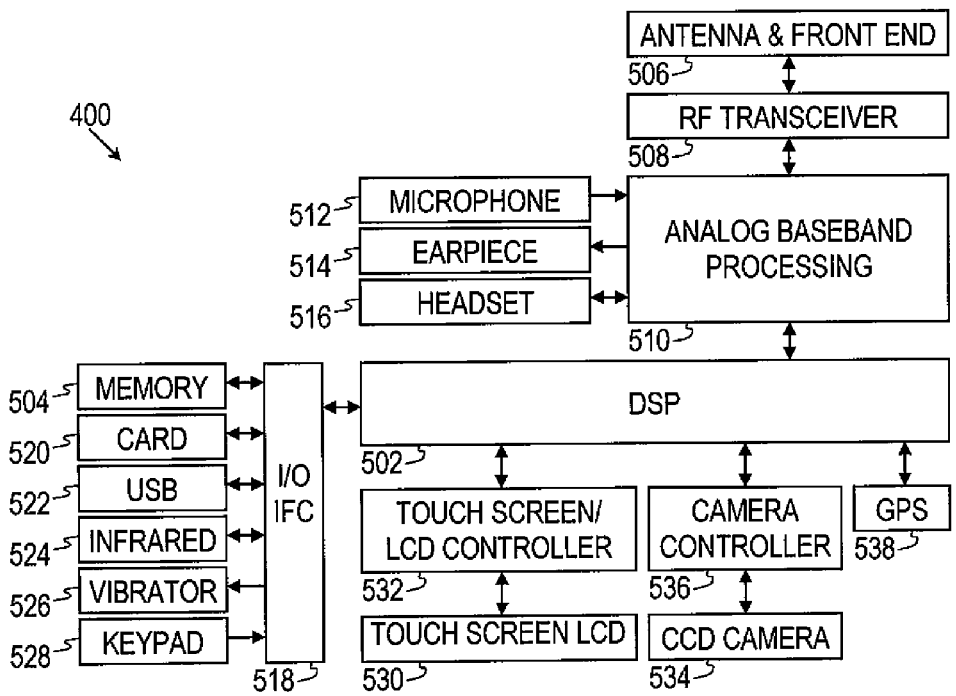
FIG. 6 is a block diagram of a handset suitable for implementing an embodiment of the disclosure.

FIG. 6 shows a block diagram of the handset 400. While a variety of known components of handsets 400 are depicted, in an embodiment, a subset of the listed components and/or additional components not listed may be included in the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 400 in accordance with embedded software or firmware stored in memory 504 or stored in memory contained within the DSP 502 itself. In addition to the embedded software or firmware, the DSP 502 may execute other applications stored in the memory 504 or made available via information carrier media, such as portable data storage media (e.g., the removable memory card 520) or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 400 to send and receive information from a radio access network (RAN) or some other available wireless communications network or from a peer handset 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converts received RF signals to baseband, and converts baseband transmit signals to RF. In some descriptions, a radio transceiver or RF transceiver may include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs. For example, analog processing of inputs from the microphone 512 and the headset port 516 and outputs to the earpiece speaker 514 and the headset port 516. To that end, the analog baseband processing unit 510 may have ports that connect to the built-in microphone 512 and the earpiece speaker 514 that enable the handset 400 to be used as a mobile phone. The analog baseband processing unit 510 may further include a port to connect to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components such as the DSP 502 or other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, in a code division multiple access (CDMA) technology application for a transmitter function, the DSP 502 may perform modulation, coding, interleaving, and spreading. For a receiver function the DSP 502 may perform despreading, deinterleaving, decoding, and demodulation. In another embodiment, in an orthogonal frequency division multiplex access (OFDMA) technology application for the transmitter function, the DSP 502 may perform modulation, coding, interleaving, inverse fast Fourier transforming, and cyclic prefix appending. For a receiver function, the DSP 502 may perform cyclic prefix removal, fast Fourier transforming, deinterleaving, decoding, and demodulation. In other wireless technology applications, additional signal processing functions and combinations of signal processing functions may be performed by the DSP 502.

The DSP 502 may communicate with a wireless network via the analog baseband processing unit 510. In some embodiments, the communication may provide Internet connectivity to enable a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the handset 400 to communicate wirelessly with other nearby handsets and/or wireless base stations.

The input/output interface 518 may further connect the DSP 502 to the vibrator 526, so that when triggered, causes the handset 400 to vibrate. The vibrator 526 may serve as a mechanism to silently alert the user to any of various events (e.g., an incoming call, a new text message, an appointment reminder).

The keypad 528 couples to the DSP 502 via the input/output interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. In another embodiment, a camera operating according to a technology other than charge coupled device cameras may be employed. Various other peripherals may also be included to provide additional functions such as radio and television reception.

Figure 7:
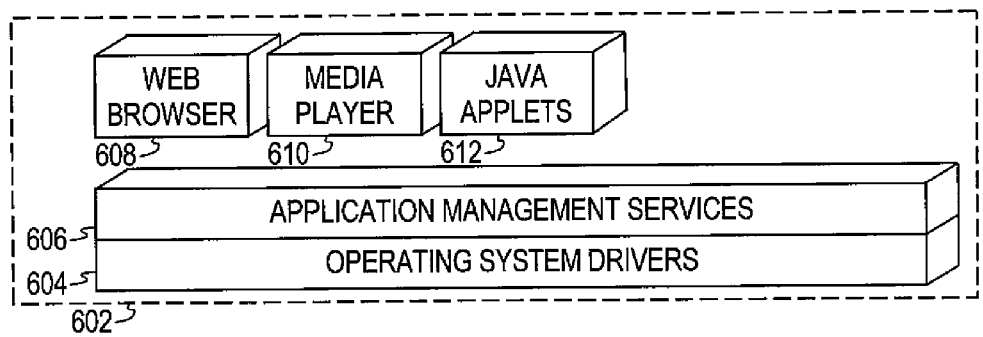
FIG. 7 is a block diagram of a software architecture of a handset suitable for implementing an embodiment of the disclosure.

FIG. 7 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services (AMS) 606 that transfer control between applications that run on the handset 400. Also shown in FIG. 7 are a web browser application 608, a media player application 610, and JAVA applets 612. The web browser application 608 configures the handset 400 to operate as a web browser, allowing a user to enter information into forms and select links to retrieve and view web pages. The media player application 610 configures the handset 400 to retrieve and play audio or audiovisual media. The JAVA applets 612 configure the handset 400 to provide games, utilities, and other functionality.

Figure 8:
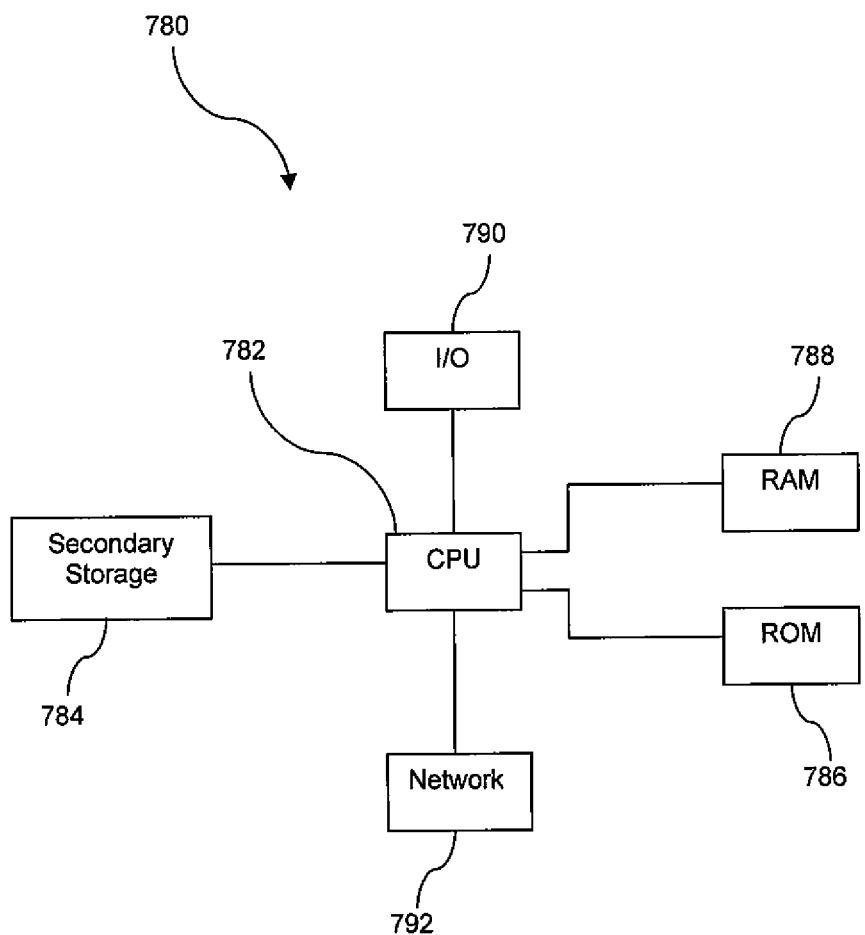
FIG. 8 illustrates an exemplary general purpose computer system suitable for implementing some aspects of the several embodiments of the disclosure.

Some aspects of the system described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

The secondary storage 784 is typically comprised of one or more disk drives or tape drives and is used to store non-volatile data or over-flow data if RAM 788 is not large enough to hold all working data. Secondary storage 784 may be used to store programs that are loaded into RAM 788 when such programs are selected for execution. The ROM 786 is used to store instructions and perhaps data that are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an Internet or one or more intranets. With such a network connection, the processor 782 might receive information from the network or might output information to the network in the course of performing the above-described method steps. Such information, which is often represented as a sequence of instructions to be executed using processor 782, may be received from and output to the network in the form of a computer data signal embodied in a carrier wave.

Such information, which may include data or instructions to execute using processor 782, may be received from and output to the network in the form of a computer data baseband signal or signal embodied in a carrier wave. The baseband signal or signal embodied in the carrier wave generated by the network connectivity devices 792, may propagate in or on the surface of electrical conductors, in coaxial cables, in waveguides, in optical media (e.g., optical fiber), in the air, or in free space. The information contained in the baseband signal or signal embedded in the carrier wave may be sequenced differently as desired for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts accessed from the hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A dashboard for use in a vehicle, comprising:
   a dashboard display screen to present a plurality of information components to a vehicle occupant; and
   a processor that determines a condition, the condition comprising at least one of a fuel condition, a brake fluid condition, a speed condition, a tire pressure condition, an oil condition, an engine condition, an instrument condition, a washer fluid condition, an anti-lock brake system condition, a traction control system condition, a windshield wiper motor condition, a safety restraint system condition, or a weather condition and then adapts a display signal based on the condition,
   wherein the processor sends the display signal to the dashboard display screen to command presentation by the dashboard display screen of the information components,
   wherein adapting the display signal comprises at least one of changing the size, changing the location, or changing the scale of a first information component presented on the dashboard display screen based on the condition, and
   wherein adapting the display signal further comprises at least one of concurrently changing the location or concurrently changing the size of a second information component in coordination with and based on the change of the information component, and
   wherein adapting the display signal further comprises providing a detailed alert based on the condition.

2. The dashboard of claim 1, wherein the dashboard display screen is a liquid crystal display (LCD) screen.

3. The dashboard of claim 1, wherein the information components comprise at least two of a speedometer display, a tachometer display, a temperature gauge display, an oil pressure gauge display, a voltage gauge display, a fuel gauge display, a transmission gear selection display, and a vehicle system status display.

4. The dashboard of claim 1, wherein the dashboard display is customizable for each driver of a plurality of drivers of the vehicle, and wherein the processor receives an input identifying a driver of the plurality of drivers and in response to the input identifying the driver, customizes the first display signal based partly on a predefined set of display preferences associated with the driver.

5. The dashboard of claim 1, further comprising a radio transceiver communicatively coupled to the processor, wherein the processor sends another display signal to the radio transceiver, the radio transceiver transmits the other display signal, wherein the other display signal is based on the display signal, and wherein the other display signal is used by a remote station to display at least a portion of the information presented by the dashboard display screen.

6. The dashboard of claim 5, wherein the processor transmits information about at least one of the conditions via the transceiver, wherein the information about at least one of the conditions is used by a proximate vehicle in wireless communication with the transceiver to analyze driving conditions.

7. The processor of claim 5, wherein the radio transceiver promotes at least one of code division multiple access (CDMA), global system for mobile communications (GSM), worldwide interoperability for microwave access (WiMAX), or WiFi wireless communications.

8. A method of presenting a dashboard display of a vehicle on a remote display, comprising:
wirelessly transmitting a dashboard display access request message to the vehicle;
wirelessly receiving a dashboard display signal from the vehicle; and
presenting, by the remote display, the dashboard display of the vehicle based on the dashboard display signal,
wherein the entire dashboard display presented in the vehicle is duplicated by the dashboard display presented on the remote display of the vehicle.

9. The method of claim 8, wherein the dashboard display comprises at least one of a fuel condition, a brake fluid condition, a speed condition, an engine revolutions per minute condition, a tire pressure condition, an oil pressure condition, an oil level condition, an engine condition, an instrument condition, a washer fluid condition, an anti-lock brake system condition, a traction control system condition, a windshield wiper motor condition, a safety restraint system condition, or a weather condition.

10. The method of claim 8, wherein the transmitting and receiving wirelessly is based on one of code division multiple access (CDMA), global system for mobile communications (GSM), worldwide interoperability for microwave access (WiMAX), or WiFi wireless communications technology.

11. The method of claim 8, wherein components of the dashboard display change at least one of size, position, or color based on an operating environment of the vehicle.

12. A dashboard for use in a first vehicle, comprising;
a processor;
a radio transceiver communicatively coupled to the processor;
a plurality of software components that, when executed by the processor, provide functionality of one of a sensor or a first graphical display component; and
a dashboard display screen to present information based on a display command signal received from the processor,
wherein the processor transmits the display command signal to the dashboard display screen based on at least one of the software components with a graphical display component functionality,
wherein the display command signal changes at least one of the size, the location, or the color of the graphical display component based on at least one condition of the first vehicle,
wherein the processor wirelessly receives information from a second vehicle proximate the first vehicle via the radio transceiver, wherein the display command signal further changes at least one of the size, the location, or the color of a second graphical display component based on at least one condition of the second vehicle,
wherein the information presented by the dashboard display screen comprises a recommended action based at least in part on the information from the second vehicle, and
wherein the display command signal further provides a detailed alert based on the at least one condition of the first vehicle or the at least one condition of the second vehicle.

13. The dashboard of claim 12, wherein the processor receives a request for subscription to one of the software components having sensor functionality and wherein the processor transmits information from the software component having the sensor functionality in response to receiving the request for subscription.

14. The dashboard of claim 12, wherein the display command signal is based at least in part on the information from the second vehicle.

15. The dashboard of claim 14, wherein the recommended action comprises at least one of slowing down, taking a different route, or adapting to weather conditions.

16. The dashboard of claim 12, wherein the display command signal changes a resolution of the of the graphical display component.

17. The dashboard of claim 12, wherein the radio transceiver transmits using at least one of code division multiple access (CDMA), global system for mobile communications (GSM), worldwide interoperability for microwave access (WiMAX), or WiFi wireless communication technology.

18. The dashboard of claim 12, wherein the software components that provide graphical display component functionality are software widgets, and wherein the software widgets comprise a plurality of a weather widget, a stock market widget, a music widget, or a news widget.

19. The dashboard of claim 1, wherein the condition is one of a low tire pressure condition or a low oil level condition, wherein when the condition is the low tire pressure condition, the detailed alert comprises which tire is low and by how many pounds per square inch, and wherein when the condition is the low oil level condition, the detailed alert comprises a quantity of oil remaining or a quantity of oil below the full level.

20. The dashboard of claim 4, wherein the driver is identified based on an ignition key or a component of the dashboard.

* * * * *